United States Patent
Li et al.

(10) Patent No.: US 10,311,252 B2
(45) Date of Patent: Jun. 4, 2019

(54) TECHNOLOGIES FOR PROTECTING DYNAMICALLY GENERATED MANAGED CODE WITH PROTECTION DOMAINS

(71) Applicant: Intel Corporation, Santa Clara, CA (US)

(72) Inventors: Xiaoning Li, Portland, OR (US);
Mingqiu Sun, Beaverton, OR (US);
David A. Koufaty, Portland, OR (US);
Ravi L. Sahita, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 258 days.

(21) Appl. No.: 15/459,640

(22) Filed: Mar. 15, 2017

(65) Prior Publication Data
US 2018/0268170 A1   Sep. 20, 2018

(51) Int. Cl.
*G06F 21/00* (2013.01)
*G06F 21/62* (2013.01)

(52) U.S. Cl.
CPC .............................. *G06F 21/6281* (2013.01)

(58) Field of Classification Search
CPC . H04L 63/0861; H04L 63/0876; G06F 21/32; G06F 21/604; G06Q 10/109
See application file for complete search history.

(56) References Cited

U.S. PATENT DOCUMENTS

| | | | |
|---|---|---|---|
| 6,546,546 B1 * | 4/2003 | Van Doorn | G06F 9/468 711/E12.009 |
| 7,926,086 B1 * | 4/2011 | Violleau | G06F 21/629 713/161 |
| 2005/0172138 A1 * | 8/2005 | Ezzat | G06F 9/468 713/189 |
| 2014/0208442 A1 * | 7/2014 | Mooring | G06F 9/45533 726/30 |
| 2014/0283040 A1 * | 9/2014 | Wilkerson | G06F 21/52 726/22 |
| 2018/0060244 A1 * | 3/2018 | Godard | G06F 12/0875 |

* cited by examiner

*Primary Examiner* — Anthony D Brown
*Assistant Examiner* — William A Corum, Jr.
(74) *Attorney, Agent, or Firm* — Barnes & Thornburg LLP

(57) ABSTRACT

Technologies for managed code execution include a computing device having a processor with protection key support. The computing device sets a protection key register of the processor with permissions to disallow data access to any protection domain of the computing device and then executes a domain switch routine to switch to a managed applet. The managed applet is included in an applet protection domain, the domain switch routine is included in a switch protection domain, and a managed runtime environment is included in a normal protection domain. The domain switch routine sets the protection key register with permissions to disallow access to any protection domain other than the applet protection domain and then executes the managed applet. Other managed applets may be each be included in separate applet domains. Each managed applet may be a thread executed within a common process address space. Other embodiments are described and claimed.

25 Claims, 6 Drawing Sheets

TECHNOLOGIES FOR PROTECTING DYNAMICALLY GENERATED MANAGED CODE WITH PROTECTION DOMAINS

BACKGROUND

Managed runtime languages, such as Java® and the Microsoft® common language runtime, are popular among software developers for many computing tasks in a wide variety of usage scenarios. For example, many cloud computing workloads are executed using a managed runtime environment. As another example, many trusted execution environments also support execution with a managed runtime environment. Managed runtime environments, such as the Java virtual machine, may execute multiple managed threads within a single operating system process. Security and isolation between threads may be enforced by a software firewall that uses language features such as the Java memory model, namespaces, or other aspects of the Java programming model. However, arbitrary bytecode executed by the Java virtual machine may circumvent those language features. Thus, many systems execute a separate Java virtual machine process instance for every managed thread.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
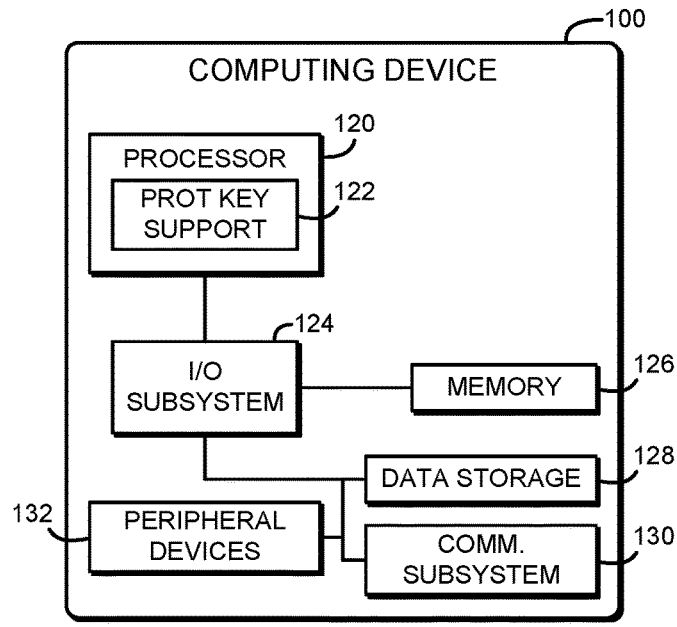
FIG. 1 is a simplified block diagram of at least one embodiment of a computing device for managed code execution with protection domain support.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative computing device 100 for managed code execution with protection domain support includes a processor 120 with protection key support 122. In use, as described below, the computing device 100 establishes a normal protection domain for normal operation of a managed runtime environment, a secure protection domain for secure code of the managed runtime environment, an applet protection domain for each applet to be executed by the managed runtime environment, and a switch protection domain to switch protection key permissions. The computing device 100 may invoke a domain switch method of the switch protection domain to securely switch protection key permissions and start execution of a managed applet. During execution of the managed applet, the processor 120 enforces the protection key permissions, which may enforce memory isolation between the applet, the managed runtime environment, and/or other applets executed by the computing device 100. Thus, the computing device 100 provides a hardware-supported thread-level isolation mechanism for managed code execution. Accordingly, the computing device 100 may be capable of securely executing multiple applets with only a single operating system process instance of a managed runtime, which may improve resource efficiency and performance. Additionally, by using the protection key support 122 of the processor 120, the computing device 100 may provide memory isolation without requiring expensive context switches an operating system or other privileged code.

The computing device 100 may be embodied as any type of device capable of predictable dynamic address assignment and otherwise performing the functions described herein. For example, the computing device 100 may be embodied as, without limitation, a mobile computing device, a smartphone, a wearable computing device, an Internet-of-Things device, a laptop computer, a tablet computer, a notebook computer, a computer, a workstation, a server, a multiprocessor system, and/or a consumer electronic device. As shown in FIG. 1, the illustrative computing device 100 includes the processor 120, the I/O subsystem 124, a memory 126, and a data storage device 128. Additionally, in some embodiments, one or more of the illustrative components may be incorporated in, or otherwise form a portion of, another component. For example, the memory 126, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. As shown, the processor 120 includes protection key support 122. As described further below, the protection key support 122 allows user-level software (e.g., application code executing in ringlevel 3 or other unprivileged software) to establish multiple protection domains within the memory 126. Each protection domain may be tagged or otherwise identified with a protection domain identifier. In the illustrative embodiment, the protection domain identifiers are embodied as 4-bit values that are stored in a corresponding 4-bit field of a page table entry. As described further below, the protection key support 122 further includes a protection key register of the processor 120 that allows user-level software to restrict read or write access to each protection domain. When protection key support 122 is enabled, the processor 120 monitors user-mode accesses to memory and generates an exception or other fault in response to a prohibited read or write access. Thus, the protection key support 122 may allow application software or other user-level software to efficiently control access to multiple regions of memory without requiring system calls to kernel-level software and without requiring page table modifications or cache invalidations. Note that in the illustrative embodiment, the protection key support 122 only applies to user-mode read/write data access to memory (i.e., load and store instructions). The illustrative protection key support 122 does not apply to execute access to memory (i.e., instruction fetches) or to kernel-mode memory accesses.

The memory 126 may be embodied as any type of volatile or non-volatile memory or data storage capable of performing the functions described herein. In operation, the memory 126 may store various data and software used during operation of the computing device 100 such operating systems, applications, programs, libraries, and drivers. As described above, in operation the memory 126 includes page tables used for paging and virtual memory address translation, and the page table entries may include protection domain identifiers. The memory 126 is communicatively coupled to the processor 120 via the I/O subsystem 124, which may be embodied as circuitry and/or components to facilitate input/output operations with the processor 120, the memory 126, and other components of the computing device 100. For example, the I/O subsystem 124 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with the processor 120, the memory 126, and other components of the computing device 100, on a single integrated circuit chip.

The data storage device 128 may be embodied as any type of device or devices configured for short-term or long-term storage of data such as, for example, memory devices and circuits, memory cards, hard disk drives, solid-state drives, non-volatile flash memory, or other data storage devices. The computing device 100 may also include a communications subsystem 130, which may be embodied as any communication circuit, device, or collection thereof, capable of enabling communications between the computing device 100 and other remote devices over a computer network (not shown). The communications subsystem 130 may be configured to use any one or more communication technology (e.g., wired or wireless communications) and associated protocols (e.g., Ethernet, Bluetooth®, Wi-Fi®, WiMAX, 3G, 4G LTE, etc.) to effect such communication.

As shown, the computing device 100 may further include one or more peripheral devices 132. The peripheral devices 132 may include any number of additional input/output devices, interface devices, and/or other peripheral devices. For example, in some embodiments, the peripheral devices 132 may include a display, touch screen, graphics circuitry, keyboard, mouse, speaker system, microphone, network interface, and/or other input/output devices, interface devices, and/or peripheral devices.

Figure 2:
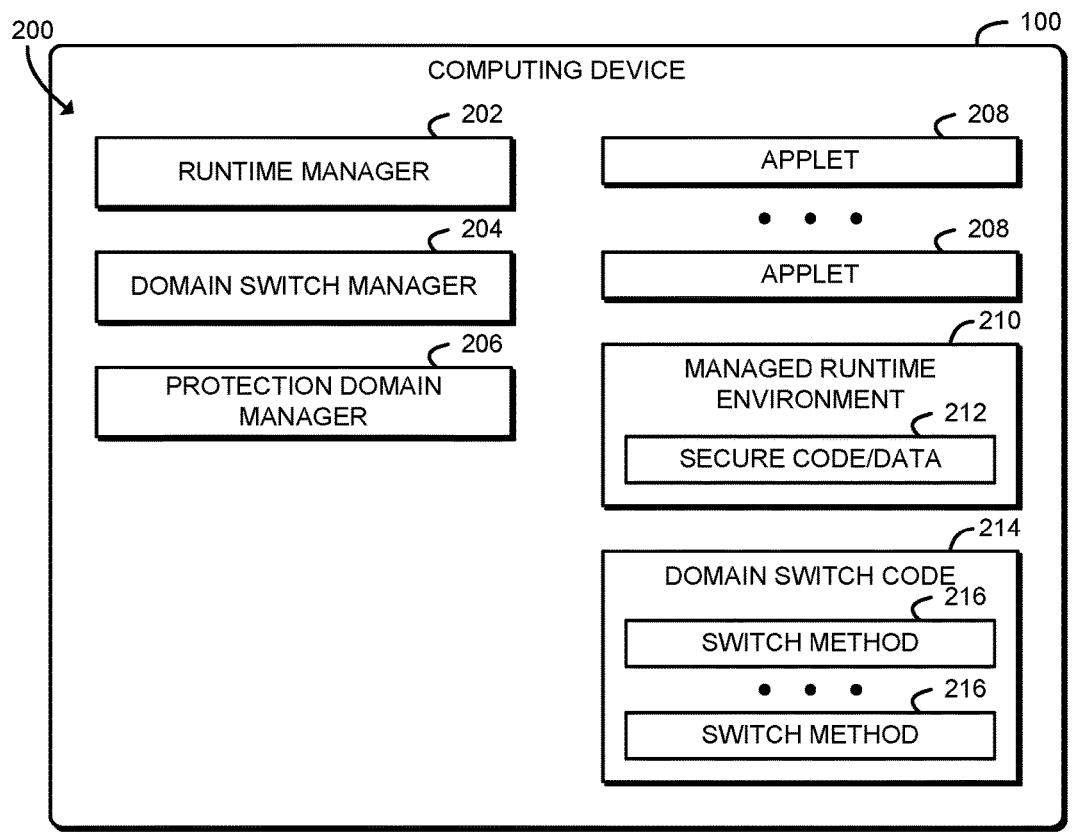
FIG. 2 is a simplified block diagram of at least one embodiment of an environment of the computing device of FIG. 1.

Referring now to FIG. 2, in an illustrative embodiment, the computing device 100 establishes an environment 200 during operation. The illustrative environment 200 includes a runtime manager 202, a domain switch manager 204, and a protection domain manager 206. The various components of the environment 200 may be embodied as hardware, firmware, software, or a combination thereof. As such, in some embodiments, one or more of the components of the environment 200 may be embodied as circuitry or collection of electrical devices (e.g., runtime manager circuitry 202, domain switch manager circuitry 204, and/or protection domain manager circuitry 206). It should be appreciated that, in such embodiments, one or more of the runtime manager circuitry 202, the domain switch manager circuitry 204, and/or the protection domain manager circuitry 206 may form a portion of the processor 120, the I/O subsystem 124, and/or other components of the computing device 100. Additionally, in some embodiments, one or more of the illustrative components may form a portion of another component and/or one or more of the illustrative components may be independent of one another.

The protection domain manager 206 is configured to manage and enforce multiple protection domains in the memory 126 of the computing device 100. In particular, the protection domain manager 206 is configured to assign a protection domain identifier to a normal protection domain that includes a managed runtime environment 210, assign a protection domain identifier to a secure protection domain that includes secure code and data 212 of the managed runtime environment 210, and assign a protection domain identifier to a switch protection domain that includes domain switch code 214. The protection domain manager 206 is further configured to assign a protection domain identifier to each applet protection domain that includes a managed applet 208. The protection domain manager 206 is further configured to enforce, with the processor 120, protection key permissions for read or write data access to the protection domains during execution of the managed runtime environment 210, the managed applets 208, and/or the protection code 214.

The managed runtime environment 210 may be embodied as any managed execution environment, such as a Java virtual machine, common language runtime, or other runtime environment. The managed runtime environment 210 may include, for example, an interpreter, a just-in-time-compiler, a class library, and/or other components used to execute managed code. The managed runtime environment 210 may also include secure code and data 212, which may be embodied as any sensitive data that should not be freely accessed by managed code. In some embodiments, the managed runtime environment 210 may be embodied as or otherwise include an operating system process that establishes a process memory space. As shown, the managed runtime environment 210 may manage execution of one or more applets 208. Each of the applets 208 may be embodied as a thread, lightweight process, or other sub-process executed within the main process of the managed runtime environment 210.

The domain switch code 214 may be embodied as native or managed computer code that switches protection key permissions enforced by the processor 120 and then initiates execution of a destination executable code with those permissions. The domain switch code 214 includes a domain switch method 216 for each destination executable code. Each domain switch method 216 may be embodied as a function, subroutine, method, or other computer routine that may be executed by the processor 120.

The runtime manager 202 is configured to set a protection key register of the processor 120 with permissions to disallow data access to any protection domain of the computing device 100 and then execute a domain switch method 216 to switch to a destination executable code. For example, the runtime manager 202 may be configured to execute a domain switch method 216 to switch to the managed runtime environment 210, to secure code of the managed runtime environment 210, and/or to any one of the managed applets 208. The runtime manager 202 may be further configured to compile applet code (e.g., bytecode, intermediate language code, or other managed code) into a managed applet 208 and store the managed applet 208 in an applet protection domain. The runtime manager 202 may be further configured to perform security checks on the managed applet 208, such as determining whether the managed applet 208 includes any processor instructions or gadgets to write to the protection key register.

The domain switch manager 204 is configured to set the protection key register of the processor 120 with permissions for the destination executable code in response to executing the corresponding domain switch method 216 and then initiate execution of the destination executable code. For example, the domain switch manager 204 may be configured to set the protection key register with permissions to disallow data access to any protection domain other than one of the applet protection domains and then execute the corresponding managed applet 208. As another example, the domain switch manager 204 may be configured to set the protection key register with permissions to disallow data access to the switch protection domain and the secure protection domain and then execute the managed runtime environment 210. As another example, the domain switch manager 204 may be configured to set the protection key register with permissions to disallow data access to the switch protection domain and then execute the secure code of the managed runtime environment 210.

Figure 3A:
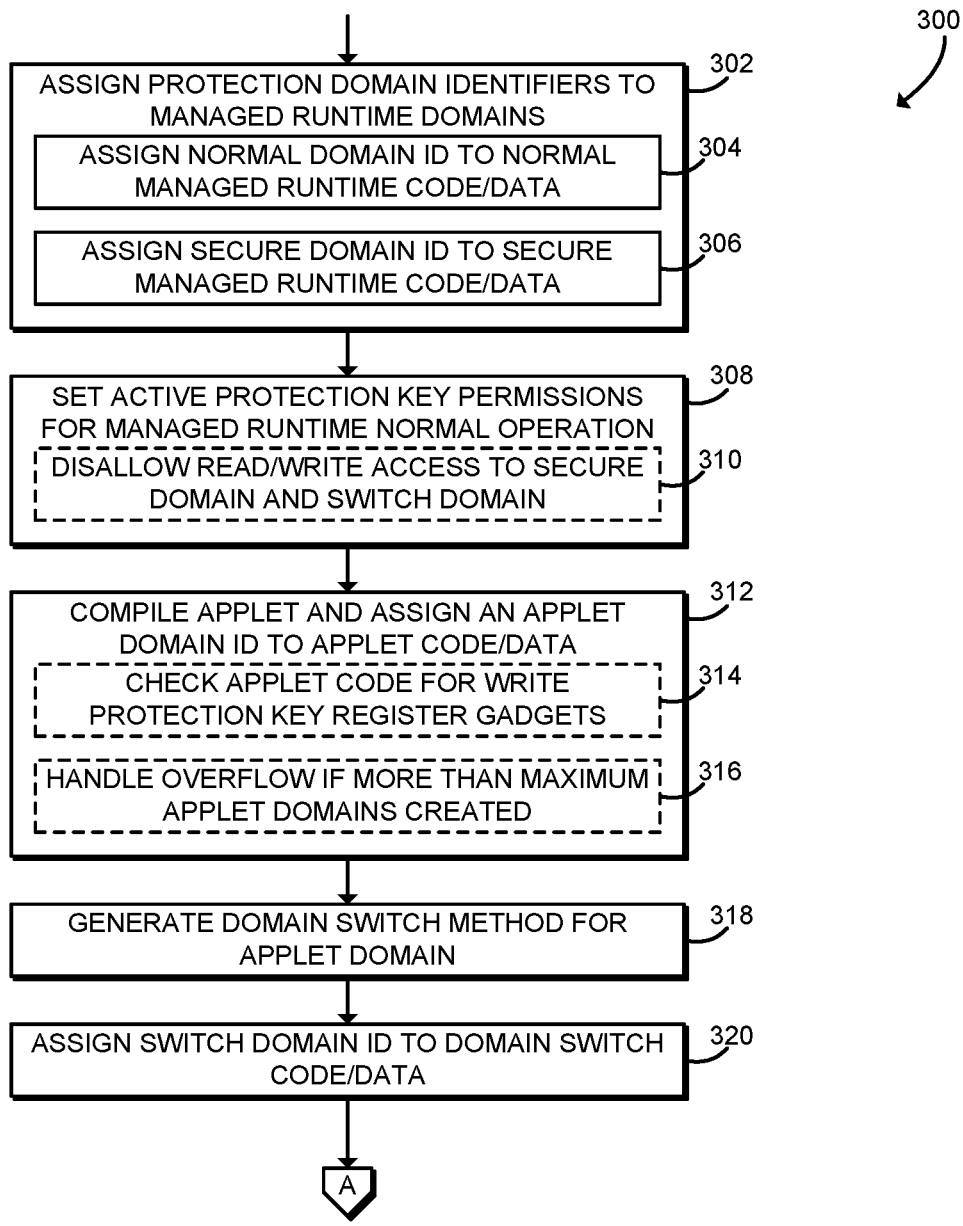
FIGS. 3A and 3B are a simplified flow diagram of at least one embodiment of a method for managed code execution that may be executed by the computing device of FIGS. 1 and 2.
Figure 3B:
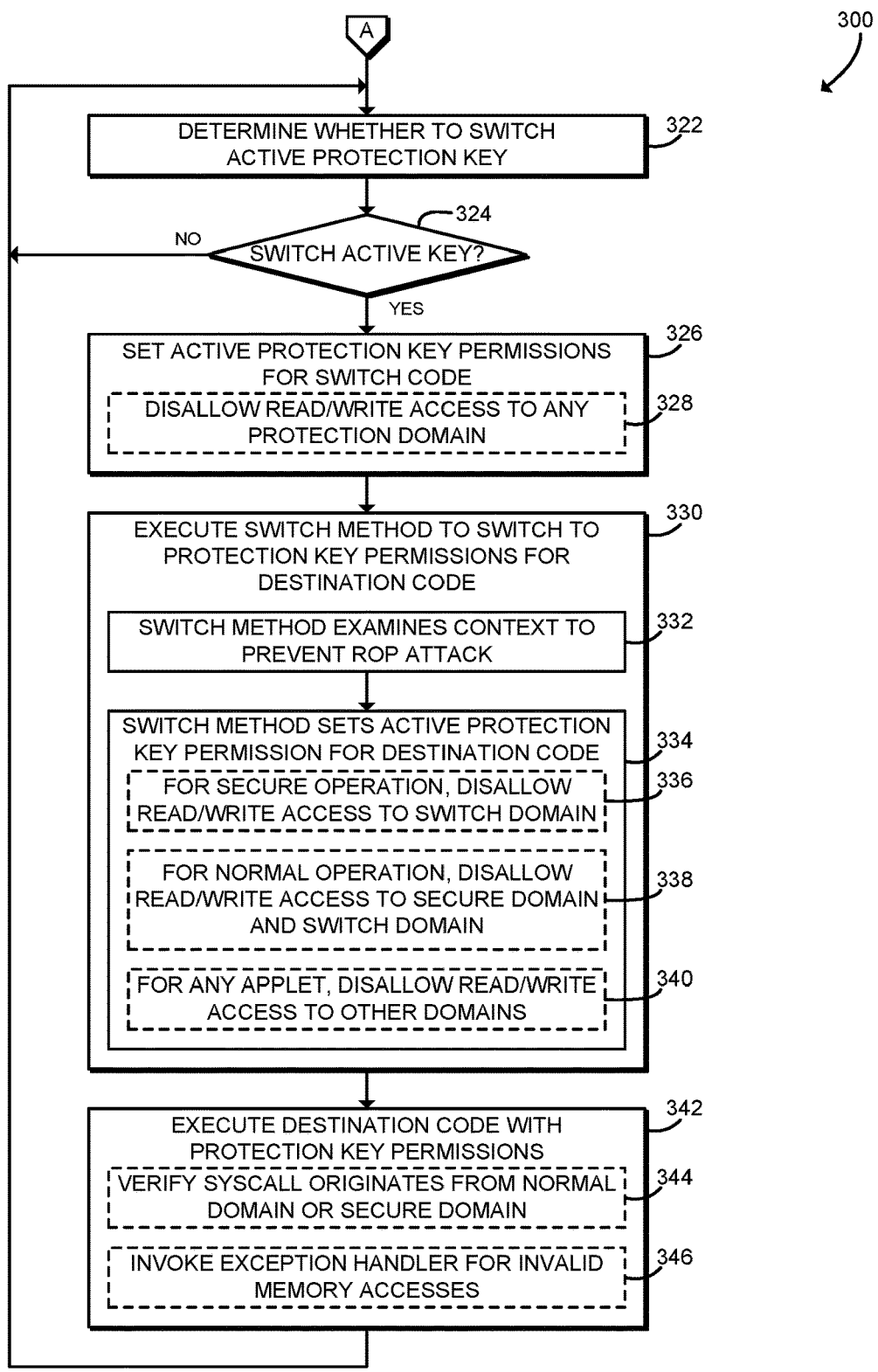

Referring now to FIGS. 3A and 3B, in use, the computing device 100 may execute a method 300 for managed code execution. It should be appreciated that, in some embodiments, the operations of the method 300 may be performed by one or more components of the environment 200 of the computing device 100 as shown in FIG. 2. The method 300 begins in block 302, in which the computing device 100 assigns protection domain identifiers for memory used by the managed runtime environment 210. The computing device 100 may assign the protection domain identifiers by writing a protection domain identifier into a field of each page table entry corresponding to the memory pages included in the protection domain. For example, for a processor 120 that supports the Intel® IA-32e memory paging model, the protection domain identifier may be stored in bits 62 to 59 of each page table entry. To write the protection domain identifiers, the computing device 100 may execute a system call or access another system-level application programming interface (API) provided by an operating system or other privileged code of the computing device 100. In block 304, the computing device 100 assigns a normal domain identifier to code and data of the managed runtime environment 210 that is not sensitive or does not otherwise require additional isolation. The code and data of the managed runtime environment may include, for example, virtual machines, interpreters, just-in-time-compilers, class libraries, and other components of the managed runtime environment 210. In block 306, the computing device 100 assigns a secure domain identifier to secure code and data 212 of the managed runtime environment 210. The secure code and data 212 may include any code or data that should not be readable or writable from ordinary code, such as passwords, encryption keys, private data, or other sensitive data.

Figure 4:
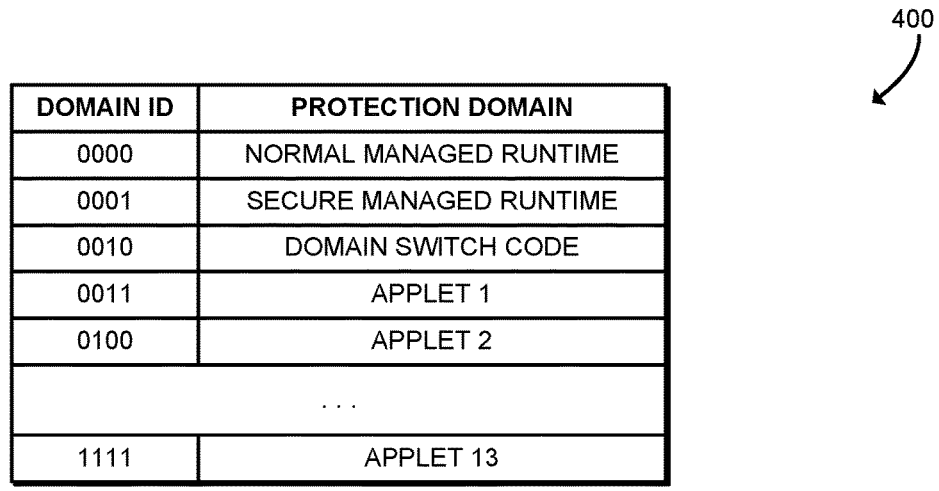
FIG. 4 is a tabular diagram of at least one embodiment of protection domains and associated identifiers that may be established by the computing device of FIGS. 1-2.

Referring now to FIG. 4, tabular diagram 400 illustrates one potential embodiment of the protection domains and associated protection domain identifiers that may be established by the computing device 100. As shown, each protection domain identifier is a four-bit binary value. Thus, the illustrative computing device 100 supports up to 16 different protection domains. The identifier 0000 is assigned to the normal domain for the managed runtime environment 210. The identifier 0001 is assigned to the secure domain for the secure code or data 212 of the managed runtime environment 212. The identifier 0010 is assigned to a switch domain for the domain switch code 214. As described further below, each of the remaining domain identifiers may be assigned to an applet domain for a corresponding applet 208. Thus, the illustrative computing device 100 may support individual protection domains for up to 13 different applets 208. For example, the identifier 0011 may be assigned to applet domain 1, the identifier 0100 may be assigned to applet domain 2, and so on, up to the identifier 1111, which may be assigned to applet domain 13. Although illustrated as including three managed runtime environment domains and 13 applet domains, it should be understood that other embodiments may include a different number of domains.

Referring back to FIG. 3A, after assigning the protection domain identifiers to the managed runtime environment 210, in block 308 the computing device 100 sets the active protection key permissions for normal operation of the managed runtime environment 210. The protection key permissions may instruct the processor 120 to prohibit read or write data access to various protection domains of the computing device 100. The computing device 100 may set the protection key permissions by executing a processor instruction such as the WRPKRU instruction to write a value to a protection key register PKRU. The WRPKRU instruction may be executed by user-level code (e.g., by ringlevel 3 code) and thus may be executed by the managed runtime environment 210 without invoking an operating system kernel or other privileged code. The processor 120 may also provide a RDPKRU instruction for reading the value of the protection key register, and the value of the protection key register may be automatically saved and restored during a process context switch using the XSAVE and XRESTORE instructions. In some embodiments, in block 310 the computing device 100 may set active protection key permissions that prohibit read and write access to the secure domain and to the switch domain. Thus, during normal operation of the managed runtime environment 210, the computing device 100 may allow read and write access to code and data of the managed runtime environment 210 within the normal domain as well as code and data of applets 208 within the applet domains. The computing device 100 may prohibit reads or writes of the secure code and data 212 and of the domain switch code 214.

Figure 5:
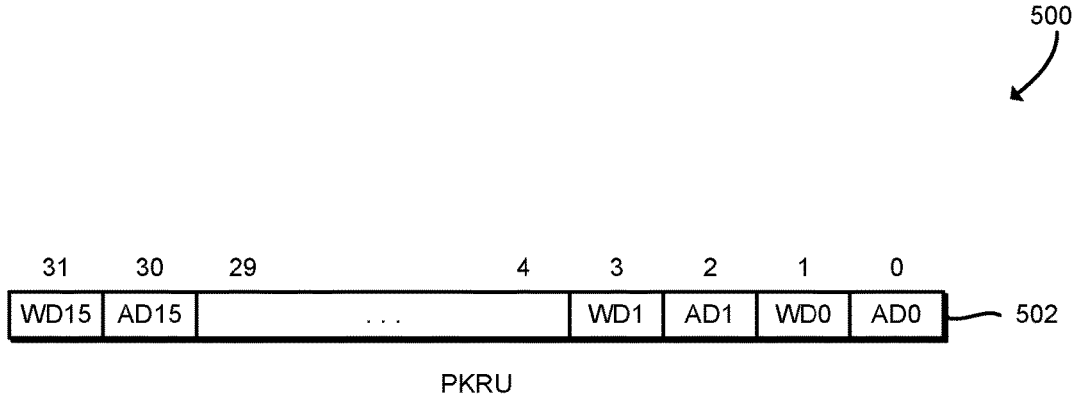
FIG. 5 is a schematic diagram of at least one embodiment of a protection key register of the computing device of FIGS. 1-2.

Referring now to FIG. 5, diagram 500 illustrates one potential embodiment of a protection key register 502. The protection key register 502 is illustratively embodied as a 32-bit register of the processor 120. Because the protection key register 502 may be accessed and modified by user-level code (e.g., ringlevel 3 code), the protection key register 502 may be identified with the mnemonic PKRU. The protection key register 502 includes 16 pairs of bits, and each pair of bits indicates whether to deny read or write access to a particular protection domain. For example, when bit zero, labeled AD0, is set the processor 120 prohibits access (i.e., read access or load instructions) to memory in protection domain zero (e.g., with domain identifier equal to 0000). When bit one, labeled WD0, is set the processor 120 prohibits writes (i.e., store instructions) to memory in protection domain zero (e.g., with domain identifier equal to 0000). Similarly, bits AD1 and WD1, when set, prohibit read and write access, respectively, to memory in protection domain one (e.g., with domain identifier equal to 0001). The protection key register 502 thus includes ADi and WDi bits for each protection domain supported by the computing device 100, up to bits AD15 and WD15 for protection domain 15 (e.g., with domain identifier equal to 1111). As described above in connection with block 310, for normal operation of the managed runtime environment 210, the protection key register 502 may be set to prohibit read or write access to the secure domain (identifier 0001) and the switch domain (identifier 0010). Thus, in normal operation, the protection key register 502 may be set with the value 0x0000003C, corresponding to setting the bits AD1, WD1, AD2, and WD2.

Referring back to FIG. 3A, after setting the protection key register permissions, in block 312 the computing device 100 compiles one or more applets 208 and assigns an applet domain identifier to the code and data of the applet 208. For example, the computing device 100 may execute a just-in-time compiler to convert managed code (e.g., Java bytecode) into native code executable by the processor 120 and store the native, generated code in the memory 126. The computing device 100 may access a system API to assign an applet domain identifier to the generated code. Each applet 208 may be assigned a different applet domain identifier. The computing device 100 checks the generated applet code to ensure than no protection domain change instruction (i.e., WRPKRU) is invoked. In block 314, in some embodiments the computing device 100 may check the generated applet code for potential gadgets that may write to the protection key register. For example, the computing device 100 may check the generated code and data of the applet 208 for a sequence of bytes corresponding to the WRPKRU instruction. Because the WRPKRU instruction may be executed by user-level code (including by applet 208 code), potential gadgets could be targets for return-oriented programming (ROP), control-oriented programming (COP), or other exploits. If a potential gadget is found, the computing device 100 may take appropriate remedial action, such as refusing to execute the applet 208 or removing the gadget from the generated code (e.g., by inserting one or more NOP instructions, breaking up constant values, or otherwise generating semantically identical code without the potential gadget). In some embodiments, the computing device 100 may perform additional anti-ROP checks, for example by assigning all memory pointers in the applet 208 to the switch domain (which prohibits all read/write access) rather than the associated applet domain. In some embodiments, in block 316 the computing device 100 may handle a protection domain overflow if more than the maximum number of applet domains are created. As described above, in the illustrative embodiment the computing device 100 may support a maximum of 13 applet domains. If more than 13 applets 208 are to be executed, the computing device 100 may migrate those applets to a different managed runtime environment 210 executed by a different operating system process, raise an exception, or perform any other appropriate response.

In block 318, the computing device 100 generates domain switch methods 216 for the protection domains established by the computing device 100. The computing device 100 may generate domain switch methods 216 for each of the applets 208 executed by the computing device 100 as well as the normal domain and the secure domain of the managed runtime environment 210. As described further below, each of the domain switch methods 216 safely switches execution to a particular destination executable code. In block 320, the computing device 100 assigns the switch domain identifier to code and data of the domain switch code 214, including the domain switch methods 216.

Figure 6:
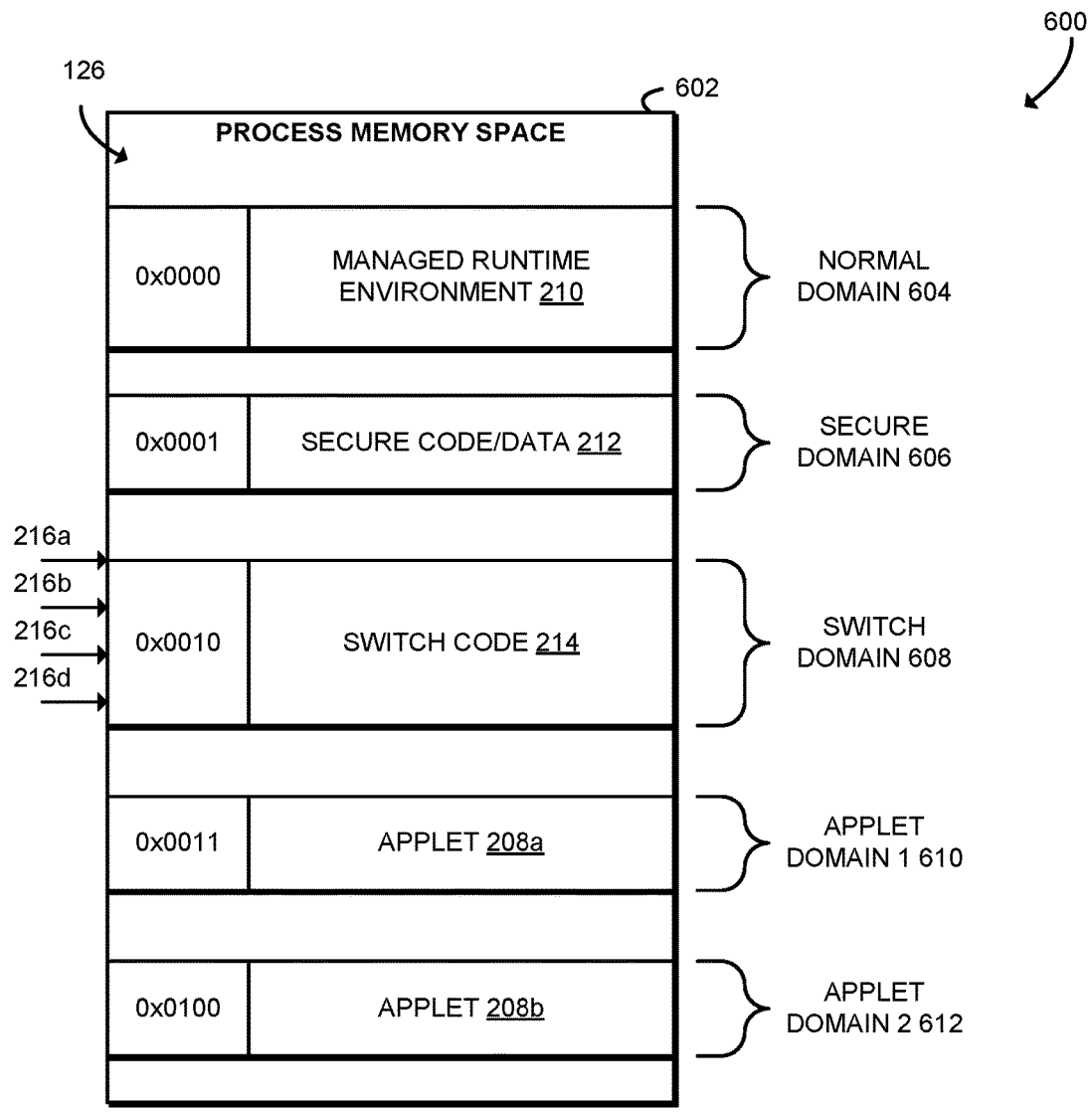
FIG. 6 is a schematic diagram at least one embodiment of the protection domains and associated identifiers that may be established by the computing device of FIGS. 1-2.

Referring now to FIG. 6, diagram 600 illustrates one potential embodiment of the protection domains that may be established by the computing device 100. The diagram 600 illustrates a process memory space 602, which may be embodied as the virtual memory space for an operating system process that executes a managed runtime environment 210 (e.g., a Java virtual machine process, common language runtime process, or other operating system process). As shown, the process memory space 602 includes multiple regions of the memory 126 that have each been assigned to particular protection domains. In particular, code and data for the managed runtime environment 210 is included in a normal domain 604, and is tagged with the domain identifier 0000. Secure code and data 212 for the managed runtime environment 210 is included in a secure domain 606 and is tagged with the domain identifier 0001. Code and data for the switch code 214 is included in a switch domain 608 and is tagged with the domain identifier 0010.

As shown, the illustrative process memory space 602 includes two applets 208a, 208b, which are included in the applet domains 610, 612 and tagged with the domain identifiers 0011 and 0100, respectively. The diagram 600 further shows that the switch code 214 includes four domain switch methods 216a, 216b, 216c, 216d. Each of the domain switch methods 216 is responsible for switching to a particular destination executable code. For example, the domain switch method 216a may switch to the managed runtime environment 210, the domain switch method 216b may switch to the secure code and data 212, the domain switch method 216c may switch to the managed applet 208a, and the domain switch method 216d may switch to the managed applet 208b. Of course, the switch code 214 may include additional domain switch methods 216 to switch to other executable ecode of the computing device 100, such as additional managed applets 208.

Although illustrated in FIG. 6 as contiguous memory regions, it should be understood that the protection domains may each be embodied as a non-contiguous collection of memory pages. Additionally, in some embodiments the various protection domains may be located at different positions in the process memory space 602, for example using address space layout randomization (ASLR).

Referring now to FIG. 3B, after establishing the protection domains, in block 322 the computing device 100 determines whether to switch the active protection key. For example, the computing device 100 may determine whether to switch execution from normal operation of the managed runtime environment 210 to one of the applets 208 or to secure operation of the managed runtime environment 210 (e.g., to access the secure code and data 212). As another example, when executing an applet 208, the computing device 100 may determine whether to switch back to normal operation of the managed runtime environment 210, for example to access a managed runtime service, an operating system service, or other data outside of the applet protection domain. In block 324, the computing device 100 checks whether to switch the active protection key. If the computing device 100 determines not to switch active protection keys, the method 300 loops back to block 322 to continue execution with the current active protection key. The processor 120 continues to enforce the active protection key permissions included in the protection key register. If the computing device 100 determines to switch to a new active protection key, the method 300 advances to block 326.

In block 326, the computing device 100 sets the active protection key permissions to execute the switch code 214. As described above, the computing device 100 may set the protection key permissions by executing a user-mode instruction such as WRPKRU to write the permissions to the protection key register PKRU. In some embodiments, in block 328 the computing device 100 may write protection key permissions that prohibit read and write access to any protection domain of the computing device 100. For example, the protection key register may be written with the value 0xFFFFFFFF. Thus, during execution of the switch code 214, the computing device 100 may not perform read or write access to any memory 126 of the computing device 100. Of course, the computing device 100 may continue to execute instructions because instruction fetch operations are not restricted by the protection key permissions.

In block 330, the computing device 100 executes a domain switch method 216 in the switch code 214 to switch to a set of protection key permissions associated with the destination code to be executed. Each destination code available to be executed is associated with a particular domain switch method 216. For example, the computing device 100 may execute the domain switch method 216 associated with normal operation of the managed runtime environment 210, the domain switch method 216 associated with secure operation of the managed runtime environment 210, or a domain switch method 216 associated with a particular applet 208. The domain switch method 216 executes and performs operations without performing data reads or writes to memory (e.g., by executing instructions with immediate values) and thus may execute without read or write access to any protection domain. Accordingly, the computing device 100 prepares the memory 126 for execution (e.g., by applying an applet stack) before executing the domain switch method 216.

In block 332, the domain switch method 216 executed by the computing device 100 examines the current context to prevent potential return-oriented programming (ROP) attacks. For example, the computing device 100 may examine various register values to ensure that execution of the domain switch method 216 starting at its intended entry point. One potential embodiment of a technique for examining the context is described below in connection with FIGS. 7 and 8.

In block 334, the domain switch method 216 executed by the computing device 100 sets the active protection key permissions to an appropriate value for the destination code. In some embodiments, for secure operation of the managed runtime environment 210, in block 336 the computing device 100 may set protection key permissions that prohibit read and write access to the switch domain. For example, the protection key register may be programmed with the value 0x00000030. Thus, during secure operation, the computing device 100 may have read and write access to code and data of the managed runtime environment 210, including the secure code and data 212, as well as code and data of the applets 208 stored in the applet domains. The computing device 100 may not perform reads or writes of the domain switch code 214. In some embodiments, for normal operation of the managed runtime environment 210, in block 338 the computing device 100 may set protection key permissions that prohibit read and write access to the switch domain and the secure domain. As described above, the protection key register may be programmed with the value 0x0000003C. In some embodiments, for execution of an applet 208, in block 340 the computing device 100 may set protection key permissions that prohibit read and write access to any protection domain other than the protection domain of the applet 208. For example, for an applet 208 in applet domain 1 (domain identifier 0011), the protection key register may be programmed with the value 0xFFFFFF3F, for an applet 208 in applet domain 2 (domain identifier 0100), the protection key register may be programmed with the value 0xFFFFFCFF, and so on.

In block 342, the computing device 100 executes the destination code with the active protection key permissions. For example, the computing device 100 may execute code for the managed runtime environment 210 or one of the applets 208. During execution, the processor 120 enforces the protection key permissions included in the protection key register. For example, during execution an applet 208 may not perform read or write data access to the memory of another applet 208, of the managed runtime environment 210, or of the switch domain 214. As another example, during normal execution the managed runtime environment 210 may not perform read or write data access to the memory of the secure code and data 212 or of the domain switch code 214. As another example, during secure execution the managed runtime environment 210 may not perform read or write data access to the memory of the domain switch code 214. During execution, the computing device 100 may perform additional security checks to maintain memory isolation. In some embodiments, in block 344 the computing device 100 may verify that a system call to an operating system or other privileged code originates from the normal domain or the secure domain of the managed runtime environment 210. The computing device 100 may, for example, read the value of the protection key register using an instruction such as RDPKRU and determine whether the protection key register permissions are correct. Thus, the computing device 100 may prevent system calls originating from an applet 208 or other unauthorized source. In some embodiments, in block 346 the computing device 100 may execute an exception handler for invalid memory accesses. For example, the exception handler may perform an appropriate security response when an applet 208 attempts to access memory outside of the assigned applet domain. The exception handler may also handle switching to the correct active protection key permissions, for example switching back to normal operation. After executing the destination code, the method 300 loops back to block 322, in which the computing device 100 may continue to determine whether to switch the active protection key.

Figure 7:
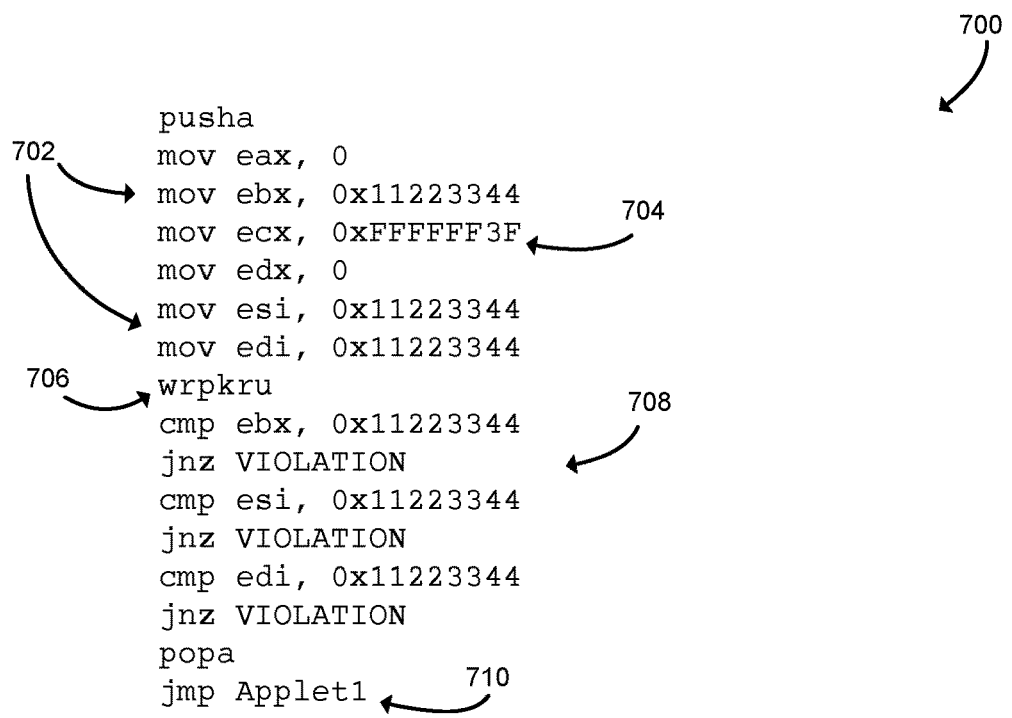
FIG. 7 is a pseudocode diagram of at least one embodiment of a domain switch method of the computing device of FIGS. 1-2.

Referring now to FIG. 7, pseudocode diagram 700 illustrates one potential embodiment of a domain switch method 216 for switching the protection key permissions to an applet domain. The pseudocode 700 may be executed by the computing device 100, for example, when switching from the normal domain of the managed runtime environment 210 to the applet 1 domain of an applet 208. The pseudocode 700 starts by loading registers of the processor 120 with constant values. In instructions 702, the registers EBX, ESI, and EDI are loaded with a guard value, which is illustratively the value 0x11223344. As described further below, the guard values are used to detect potential ROP attacks, and in some embodiments may be a random value. In instruction 704, the register ECX is loaded with a value for the protection key register PKRU. The illustrative value for the protection key register is 0xFFFFFF3F, which prohibits access to any protection domain other than the applet protection domain 1 with the domain identifier 0011, as described above. The instruction 706, WRPKRU, writes the value of the ECX register to the PKRU register of the processor 120. The instructions 708 verify that the EBX, ESI, and EDI registers include the guard value stored in the instructions 702. If the guard values are not included, then only part of the pseudocode 700 may have been executed, for example as a result of a return-oriented programming (ROP) attack or other potential exploit. If the correct value is not found, the pseudocode jumps to a violation handler, in which the computing device 100 may perform any appropriate security response. If the correct values are found, the pseudocode 700 proceeds to instruction 710, in which the computing device 100 jumps to the applet 208.

Figure 8:
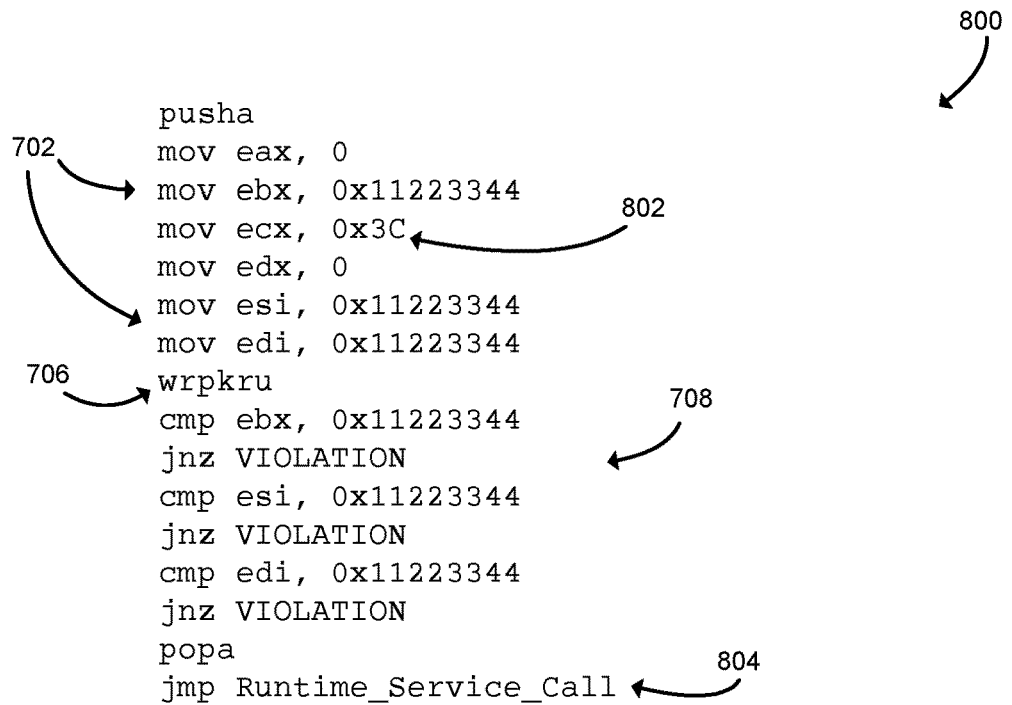
FIG. 8 is a pseudocode diagram of at least one embodiment of another domain switch method of the computing device of FIGS. 1-2.

Referring now to FIG. 8, pseudocode diagram 800 illustrates one potential embodiment of a domain switch method 216 for switching the protection key permissions to the normal domain of the managed runtime environment 210. The pseudocode 800 may be executed by the computing device 100, for example, when switching from an applet domain back to the normal domain of the managed runtime environment 210. The pseudocode 800 starts by loading registers of the processor 120 with constant values. In particular, the pseudocode 800 includes instructions 702 which load the registers EBX, ESI, and EDI with guard values as described above. In instruction 802, the register ECX is loaded with a value for the protection key register PKRU. The illustrative value for the protection key register is 0x0000003C, which prohibits access to the secure domain (domain identifier 0001) and the switch domain (domain identifier 0010), as described above. The instruction 706, WRPKRU, writes the value of the ECX register to the PKRU register of the processor 120. The instructions 708 verify that the EBX, ESI, and EDI registers include the guard value stored in the instructions 702, as described above. If the correct values are found, the pseudocode 800 proceeds to instruction 804, in which the computing device 100 jumps to the managed runtime environment 210. Illustratively, the computing device 100 jumps to the address of a managed runtime service call, which may perform a service requested by the calling applet 208.

It should be appreciated that, in some embodiments, the method 300 may be embodied as various instructions stored on a computer-readable media, which may be executed by the processor 120, the I/O subsystem 124, and/or other components of the computing device 100 to cause the computing device 100 to perform the method 300. The computer-readable media may be embodied as any type of media capable of being read by the computing device 100 including, but not limited to, the memory 126, the data storage device 128, firmware devices, other memory or data storage devices of the computing device 100, portable media readable by a peripheral device 132 of the computing device 100, and/or other media.

EXAMPLES

Illustrative examples of the technologies disclosed herein are provided below. An embodiment of the technologies may include any one or more, and any combination of, the examples described below.

Example 1 includes a computing device for managed code execution, the computing device comprising: a processor that includes a protection key register; a runtime manager to (i) set the protection key register with first permissions, wherein the first permissions disallow data access to any protection domain of the computing device, and (ii) execute a domain switch routine to switch to a managed applet in response to setting of the protection key register with the first permissions, wherein the managed applet is managed by a managed runtime environment, and wherein the managed runtime environment is included in a first protection domain, the domain switch routine is included in a second protection domain, and the managed applet is included in a third protection domain; and a domain switch manager to (i) set the protection key register with second permissions in response to execution of the domain switch routine, wherein the second permissions disallow data access to any protection domain of the computing device other than the third protection domain, and (ii) execute the managed applet in response to setting of the protection key register with the second permissions.

Example 2 includes the subject matter of Example 1, and wherein: the runtime manager is further to (i) set the protection key register with the first permissions in response to execution of the managed applet, and (ii) execute a second domain switch routine to switch to the managed runtime environment in response to setting of the protection key register with the first permissions, wherein the second protection domain includes the second domain switch routine; and the domain switch manager is further to (i) set the protection key register with third permissions in response to execution of the second domain switch routine, wherein the third permissions disallow data access to the second protection domain, and (ii) execute the managed runtime environment in response to setting of the protection key register with the third permissions.

Example 3 includes the subject matter of any of Examples 1 and 2, and wherein: the runtime manager is further to (i) set the protection key register with the first permissions in response to execution of the managed applet, and (ii) execute a second domain switch routine to switch to a second managed applet in response to setting of the protection key register with the first permissions, wherein the second protection domain includes the second domain switch routine and wherein the second managed applet is included in a fourth protection domain; and the domain switch manager is further to (i) set the protection key register with third permissions in response to execution of the second domain switch routine, wherein the third permissions disallow data access to any protection domain of the computing device other than the fourth protection domain, and (ii) execute the second managed applet in response to setting of the protection key register with the third permissions.

Example 4 includes the subject matter of any of Examples 1-3, and wherein the first managed applet comprises a first thread of a process of the computing device and the second managed applet comprises a second thread of the process.

Example 5 includes the subject matter of any of Examples 1-4, and further comprising a protection domain manager to: assign a first protection domain identifier to the first protection domain that includes a managed runtime environment; assign a second protection domain identifier to the second protection domain that includes a domain switch routine; and assign a third protection domain identifier to the third protection domain that includes a managed applet; wherein to set the protection key register comprises to set the protection key register in response to assignment of the third protection domain identifier to the third protection domain.

Example 6 includes the subject matter of any of Examples 1-5, and wherein to assign the first protection domain identifier to the first protection domain comprises to tag a memory region of the computing device with the first protection domain identifier, wherein the memory region comprises the first protection domain identifier.

Example 7 includes the subject matter of any of Examples 1-6, and wherein to tag the memory region with the first protection domain identifier comprises to write the first protection domain identifier in a field of a page table entry associated with the memory region.

Example 8 includes the subject matter of any of Examples 1-7, and wherein to set the protection key register of the processor comprises to execute a processor instruction to set the protection key register.

Example 9 includes the subject matter of any of Examples 1-8, and further comprising a protection domain manager to (i) enforce, by the processor, the first permissions during execution of the domain switch routine, and (ii) enforce, by the processor, the second permissions during execution of the managed applet.

Example 10 includes the subject matter of any of Examples 1-9, and wherein: to enforce the first permissions comprises to prohibit load instructions and store instructions to any protection domain of the computing device; and to enforce the second permissions comprises to prohibit load instructions and store instructions to any protection domain of the computing device other than the third protection domain.

Example 11 includes the subject matter of any of Examples 1-10, and wherein the runtime manager is further to: set the protection key register with third permissions, wherein the third permissions disallow data access to the second protection domain; and execute the managed runtime environment in response to setting of the protection key register with the third permissions.

Example 12 includes the subject matter of any of Examples 1-11, and further comprising a protection domain manager to enforce, by the processor, the third permissions during execution of the managed runtime environment.

Example 13 includes the subject matter of any of Examples 1-12, and wherein to enforce the third permissions comprises to prohibit load instructions and store instructions to the second protection domain.

Example 14 includes the subject matter of any of Examples 1-13, and further comprising: a protection domain manager to assign a protection domain identifier to a fourth protection domain that includes managed runtime secure code or data; wherein the runtime manager is further to (i) set the protection key register with the first permissions, and (ii) execute a second domain switch routine to switch to the managed runtime secure code in response to setting of the protection key register with the first permissions, wherein the second protection domain includes the second domain switch routine; wherein the domain switch manager is further to (i) set the protection key register with fourth permissions in response to execution of the second domain switch routine, wherein the fourth permissions disallow data access to the second protection domain, and (ii) execute the managed runtime secure code in response to setting of the protection key register with the fourth permissions; and wherein the third permissions further disallow data access to the fourth protection domain.

Example 15 includes the subject matter of any of Examples 1-14, and wherein the protection domain manager is further to enforce, by the processor, the third permissions during execution of the managed runtime environment.

Example 16 includes the subject matter of any of Examples 1-15, and wherein to enforce the third permissions comprises to prohibit load instructions and store instructions to the second protection domain and the fourth protection domain.

Example 17 includes the subject matter of any of Examples 1-16, and wherein: the runtime manager is further to (i) compile an applet code into the managed applet, and (ii) store the managed applet in the third protection domain in response to compilation of the applet code; and to set the protection key register comprises to set the protection key register in response to storage of the managed applet in the third protection domain.

Example 18 includes the subject matter of any of Examples 1-17, and wherein the runtime manager is further to determine whether the managed applet includes a processor instruction to write to the protection key register.

Example 19 includes the subject matter of any of Examples 1-18, and wherein the runtime manager is further to determine whether the managed applet includes a gadget to write to the protection key register.

Example 20 includes the subject matter of any of Examples 1-19, and wherein to execute the domain switch routine comprises to verify a context of the domain switch routine to prevent return-oriented programming attacks.

Example 21 includes the subject matter of any of Examples 1-20, and wherein the runtime manager is further to verify that a system call originates from the first protection domain.

Example 22 includes a method for managed code execution, the method comprising: setting, by a computing device, a protection key register of a processor of the computing device with first permissions, wherein the first permissions disallow data access to any protection domain of the computing device; executing, by the computing device, a domain switch routine to switch to a managed applet in response to setting the protection key register with the first permissions, wherein the managed applet is managed by a managed runtime environment, and wherein the managed runtime environment is included in a first protection domain, the domain switch routine is included in a second protection domain, and the managed applet is included in a third protection domain; setting, by the computing device, the protection key register with second permissions in response to executing the domain switch routine, wherein the second permissions disallow data access to any protection domain of the computing device other than the third protection domain; and executing, by the computing device, the managed applet in response to setting the protection key register with the second permissions.

Example 23 includes the subject matter of Example 22, and further comprising: setting, by the computing device, the protection key register with the first permissions in response to executing the managed applet; executing, by the computing device, a second domain switch routine to switch to the managed runtime environment in response to setting the protection key register with the first permissions, wherein the second protection domain includes the second domain switch routine; setting, by the computing device, the protection key register with third permissions in response to executing the second domain switch routine, wherein the third permissions disallow data access to the second protection domain; and executing, by the computing device, the managed runtime environment in response to setting the protection key register with the third permissions.

Example 24 includes the subject matter of any of Examples 22 and 23, and further comprising: setting, by the computing device, the protection key register with the first permissions in response to executing the managed applet; executing, by the computing device, a second domain switch routine to switch to a second managed applet in response to setting the protection key register with the first permissions, wherein the second protection domain includes the second domain switch routine and wherein the second managed applet is included in a fourth protection domain; setting, by the computing device, the protection key register with third permissions in response to executing the second domain switch routine, wherein the third permissions disallow data access to any protection domain of the computing device other than the fourth protection domain; and executing, by the computing device, the second managed applet in response to setting the protection key register with the third permissions.

Example 25 includes the subject matter of any of Examples 22-24, and wherein the first managed applet comprises a first thread of a process of the computing device and the second managed applet comprises a second thread of the process.

Example 26 includes the subject matter of any of Examples 22-25, and further comprising: assigning, by the computing device, a first protection domain identifier to the first protection domain that includes a managed runtime environment; assigning, by the computing device, a second protection domain identifier to the second protection domain that includes a domain switch routine; and assigning, by the computing device, a third protection domain identifier to the third protection domain that includes a managed applet; wherein setting the protection key register comprises setting the protection key register in response to assigning the third protection domain identifier to the third protection domain.

Example 27 includes the subject matter of any of Examples 22-26, and wherein assigning the first protection domain identifier to the first protection domain comprises tagging a memory region of the computing device with the first protection domain identifier, wherein the memory region comprises the first protection domain identifier.

Example 28 includes the subject matter of any of Examples 22-27, and wherein tagging the memory region with the first protection domain identifier comprises writing the first protection domain identifier in a field of a page table entry associated with the memory region.

Example 29 includes the subject matter of any of Examples 22-28, and wherein setting the protection key register of the processor comprises executing a processor instruction to set the protection key register.

Example 30 includes the subject matter of any of Examples 22-29, and further comprising: enforcing, by the processor of the computing device, the first permissions while executing the domain switch routine; and enforcing, by the processor of the computing device, the second permissions while executing the managed applet.

Example 31 includes the subject matter of any of Examples 22-30, and wherein: enforcing the first permissions comprises prohibiting load instructions and store instructions to any protection domain of the computing device; and enforcing the second permissions comprises prohibiting load instructions and store instructions to any protection domain of the computing device other than the third protection domain.

Example 32 includes the subject matter of any of Examples 22-31, and further comprising: setting, by the computing device, the protection key register with third permissions, wherein the third permissions disallow data access to the second protection domain; and executing, by the computing device, the managed runtime environment in response to setting the protection key register with the third permissions.

Example 33 includes the subject matter of any of Examples 22-32, and further comprising enforcing, by the processor of the computing device, the third permissions while executing the managed runtime environment.

Example 34 includes the subject matter of any of Examples 22-33, and wherein enforcing the third permissions comprises prohibiting load instructions and store instructions to the second protection domain.

Example 35 includes the subject matter of any of Examples 22-34, and further comprising: assigning, by the computing device, a protection domain identifier to a fourth protection domain that includes managed runtime secure code or data; execute, by the computing device, a second domain switch routine to switch to the managed runtime secure code in response to setting of the protection key register with the first permissions, wherein the second protection domain includes the second domain switch routine; setting, by the computing device, the protection key register with fourth permissions in response to executing the second domain switch routine, wherein the fourth permissions disallow data access to the second protection domain; and executing, by the computing device, the managed runtime secure code or data in response to setting the protection key register with the fourth permissions; wherein the third permissions further disallow data access to the fourth protection domain.

Example 36 includes the subject matter of any of Examples 22-35, and further comprising enforcing, by the processor of the computing device, the third permissions while executing the managed runtime environment.

Example 37 includes the subject matter of any of Examples 22-36, and wherein enforcing the third permissions comprises prohibiting load instructions and store instructions to the second protection domain and the fourth protection domain.

Example 38 includes the subject matter of any of Examples 22-37, and further comprising: compiling, by the computing device, an applet code into the managed applet; and storing, by the computing device, the managed applet in the third protection domain in response to compiling the applet code; wherein setting the protection key register comprises setting the protection key register in response to storing the managed applet in the third protection domain.

Example 39 includes the subject matter of any of Examples 22-38, and further comprising determining, by the computing device, whether the managed applet includes a processor instruction to write to the protection key register.

Example 40 includes the subject matter of any of Examples 22-39, and further comprising determining, by the computing device, whether the managed applet includes a gadget to write to the protection key register.

Example 41 includes the subject matter of any of Examples 22-40, and wherein executing the domain switch routine comprises verifying a context of the domain switch routine to prevent return-oriented programming attacks.

Example 42 includes the subject matter of any of Examples 22-41, and further comprising verifying, by the computing device, that a system call originates from the first protection domain.

Example 43 includes a computing device comprising: a processor; and a memory having stored therein a plurality of instructions that when executed by the processor cause the computing device to perform the method of any of Examples 22-42.

Example 44 includes one or more machine readable storage media comprising a plurality of instructions stored thereon that in response to being executed result in a computing device performing the method of any of Examples 22-42.

Example 45 includes a computing device comprising means for performing the method of any of Examples 22-42.

Example 46 includes a computing device for managed code execution, the computing device comprising: means for setting a protection key register of a processor of the computing device with first permissions, wherein the first permissions disallow data access to any protection domain of the computing device; means for executing a domain switch routine to switch to a managed applet in response to setting the protection key register with the first permissions, wherein the managed applet is managed by a managed runtime environment, and wherein the managed runtime environment is included in a first protection domain, the domain switch routine is included in a second protection domain, and the managed applet is included in a third protection domain; means for setting the protection key register with second permissions in response to executing the domain switch routine, wherein the second permissions disallow data access to any protection domain of the computing device other than the third protection domain; and means for executing the managed applet in response to setting the protection key register with the second permissions.

Example 47 includes the subject matter of Example 46, and further comprising: means for setting the protection key register with the first permissions in response to executing the managed applet; means for executing a second domain switch routine to switch to the managed runtime environment in response to setting the protection key register with the first permissions, wherein the second protection domain includes the second domain switch routine; means for setting the protection key register with third permissions in response to executing the second domain switch routine, wherein the third permissions disallow data access to the second protection domain; and means for executing the managed runtime environment in response to setting the protection key register with the third permissions.

Example 48 includes the subject matter of any of Examples 46 and 47, and further comprising: means for setting the protection key register with the first permissions in response to executing the managed applet; means for executing a second domain switch routine to switch to a second managed applet in response to setting the protection key register with the first permissions, wherein the second protection domain includes the second domain switch routine and wherein the second managed applet is included in a fourth protection domain; means for setting the protection key register with third permissions in response to executing the second domain switch routine, wherein the third permissions disallow data access to any protection domain of the computing device other than the fourth protection domain; and means for executing the second managed applet in response to setting the protection key register with the third permissions.

Example 49 includes the subject matter of any of Examples 46-48, and wherein the first managed applet comprises a first thread of a process of the computing device and the second managed applet comprises a second thread of the process.

Example 50 includes the subject matter of any of Examples 46-49, and further comprising: means for assigning a first protection domain identifier to the first protection domain that includes a managed runtime environment; means for assigning a second protection domain identifier to the second protection domain that includes a domain switch routine; and means for assigning a third protection domain identifier to the third protection domain that includes a managed applet; wherein the means for setting the protection key register comprises means for setting the protection key register in response to assigning the third protection domain identifier to the third protection domain.

Example 51 includes the subject matter of any of Examples 46-50, and wherein the means for assigning the first protection domain identifier to the first protection domain comprises means for tagging a memory region of the computing device with the first protection domain identifier, wherein the memory region comprises the first protection domain identifier.

Example 52 includes the subject matter of any of Examples 46-51, and wherein the means for tagging the memory region with the first protection domain identifier comprises means for writing the first protection domain identifier in a field of a page table entry associated with the memory region.

Example 53 includes the subject matter of any of Examples 46-52, and wherein the means for setting the protection key register of the processor comprises means for executing a processor instruction to set the protection key register.

Example 54 includes the subject matter of any of Examples 46-53, and further comprising: means for enforcing, by the processor of the computing device, the first permissions while executing the domain switch routine; and means for enforcing, by the processor of the computing device, the second permissions while executing the managed applet.

Example 55 includes the subject matter of any of Examples 46-54, and wherein: the means for enforcing the first permissions comprises means for prohibiting load instructions and store instructions to any protection domain of the computing device; and the means for enforcing the second permissions comprises means for prohibiting load instructions and store instructions to any protection domain of the computing device other than the third protection domain.

Example 56 includes the subject matter of any of Examples 46-55, and further comprising: means for setting the protection key register with third permissions, wherein the third permissions disallow data access to the second protection domain; and means for executing the managed runtime environment in response to setting the protection key register with the third permissions.

Example 57 includes the subject matter of any of Examples 46-56, and further comprising means for enforcing, by the processor of the computing device, the third permissions while executing the managed runtime environment.

Example 58 includes the subject matter of any of Examples 46-57, and wherein the means for enforcing the third permissions comprises means for prohibiting load instructions and store instructions to the second protection domain.

Example 59 includes the subject matter of any of Examples 46-58, and further comprising: means for assigning a protection domain identifier to a fourth protection domain that includes managed runtime secure code or data; means for execute a second domain switch routine to switch to the managed runtime secure code in response to setting of the protection key register with the first permissions, wherein the second protection domain includes the second domain switch routine; means for setting the protection key register with fourth permissions in response to executing the second domain switch routine, wherein the fourth permissions disallow data access to the second protection domain; and means for executing the managed runtime secure code or data in response to setting the protection key register with the fourth permissions; wherein the third permissions further disallow data access to the fourth protection domain.

Example 60 includes the subject matter of any of Examples 46-59, and further comprising means for enforcing, by the processor of the computing device, the third permissions while executing the managed runtime environment.

Example 61 includes the subject matter of any of Examples 46-60, and wherein the means for enforcing the third permissions comprises means for prohibiting load instructions and store instructions to the second protection domain and the fourth protection domain.

Example 62 includes the subject matter of any of Examples 46-61, and further comprising: means for compiling an applet code into the managed applet; and means for storing the managed applet in the third protection domain in response to compiling the applet code; wherein the means for setting the protection key register comprises means for setting the protection key register in response to storing the managed applet in the third protection domain.

Example 63 includes the subject matter of any of Examples 46-62, and further comprising means for determining whether the managed applet includes a processor instruction to write to the protection key register.

Example 64 includes the subject matter of any of Examples 46-63, and further comprising means for determining whether the managed applet includes a gadget to write to the protection key register.

Example 65 includes the subject matter of any of Examples 46-64, and wherein the means for executing the domain switch routine comprises means for verifying a context of the domain switch routine to prevent return-oriented programming attacks.

Example 66 includes the subject matter of any of Examples 46-65, and further comprising means for verifying that a system call originates from the first protection domain.

The invention claimed is:

1. A computing device for managed code execution, the computing device comprising:
   a processor that includes a protection key register;
   a runtime manager to (i) set the protection key register with first permissions, wherein the first permissions disallow data access to any protection domain of the computing device, and (ii) execute a domain switch routine to switch to a managed applet in response to setting of the protection key register with the first permissions, wherein the managed applet is managed by a managed runtime environment, and wherein the managed runtime environment is included in a first protection domain, the domain switch routine is included in a second protection domain, and the managed applet is included in a third protection domain; and
   a domain switch manager to (i) set the protection key register with second permissions in response to execution of the domain switch routine, wherein the second permissions disallow data access to any protection domain of the computing device other than the third protection domain, and (ii) execute the managed applet in response to setting of the protection key register with the second permissions.

2. The computing device of claim 1, wherein:
   the runtime manager is further to (i) set the protection key register with the first permissions in response to execution of the managed applet, and (ii) execute a second domain switch routine to switch to the managed runtime environment in response to setting of the protection key register with the first permissions, wherein the second protection domain includes the second domain switch routine; and
   the domain switch manager is further to (i) set the protection key register with third permissions in response to execution of the second domain switch routine, wherein the third permissions disallow data access to the second protection domain, and (ii) execute the managed runtime environment in response to setting of the protection key register with the third permissions.

3. The computing device of claim 1, wherein:
   the runtime manager is further to (i) set the protection key register with the first permissions in response to execution of the managed applet, and (ii) execute a second domain switch routine to switch to a second managed applet in response to setting of the protection key register with the first permissions, wherein the second protection domain includes the second domain switch routine and wherein the second managed applet is included in a fourth protection domain; and
   the domain switch manager is further to (i) set the protection key register with third permissions in response to execution of the second domain switch routine, wherein the third permissions disallow data access to any protection domain of the computing device other than the fourth protection domain, and (ii) execute the second managed applet in response to setting of the protection key register with the third permissions.

4. The computing device of claim 3, wherein the first managed applet comprises a first thread of a process of the computing device and the second managed applet comprises a second thread of the process.

5. The computing device of claim 1, further comprising a protection domain manager to (i) enforce, by the processor, the first permissions during execution of the domain switch routine, and (ii) enforce, by the processor, the second permissions during execution of the managed applet.

6. The computing device of claim 1, wherein the runtime manager is further to:
set the protection key register with third permissions, wherein the third permissions disallow data access to the second protection domain; and
execute the managed runtime environment in response to setting of the protection key register with the third permissions.

7. The computing device of claim 6, further comprising:
a protection domain manager to assign a protection domain identifier to a fourth protection domain that includes managed runtime secure code or data;
wherein the runtime manager is further to (i) set the protection key register with the first permissions, and (ii) execute a second domain switch routine to switch to the managed runtime secure code in response to setting of the protection key register with the first permissions, wherein the second protection domain includes the second domain switch routine;
wherein the domain switch manager is further to (i) set the protection key register with fourth permissions in response to execution of the second domain switch routine, wherein the fourth permissions disallow data access to the second protection domain, and (ii) execute the managed runtime secure code in response to setting of the protection key register with the fourth permissions; and
wherein the third permissions further disallow data access to the fourth protection domain.

8. The computing device of claim 1, wherein:
the runtime manager is further to (i) compile an applet code into the managed applet, and (ii) store the managed applet in the third protection domain in response to compilation of the applet code; and
to set the protection key register comprises to set the protection key register in response to storage of the managed applet in the third protection domain.

9. The computing device of claim 8, wherein the runtime manager is further to determine whether the managed applet includes a gadget to write to the protection key register.

10. The computing device of claim 1, wherein to execute the domain switch routine comprises to verify a context of the domain switch routine to prevent return-oriented programming attacks.

11. The computing device of claim 1, wherein the runtime manager is further to verify that a system call originates from the first protection domain.

12. A method for managed code execution, the method comprising:
setting, by a computing device, a protection key register of a processor of the computing device with first permissions, wherein the first permissions disallow data access to any protection domain of the computing device;
executing, by the computing device, a domain switch routine to switch to a managed applet in response to setting the protection key register with the first permissions, wherein the managed applet is managed by a managed runtime environment, and wherein the managed runtime environment is included in a first protection domain, the domain switch routine is included in a second protection domain, and the managed applet is included in a third protection domain;
setting, by the computing device, the protection key register with second permissions in response to executing the domain switch routine, wherein the second permissions disallow data access to any protection domain of the computing device other than the third protection domain; and
executing, by the computing device, the managed applet in response to setting the protection key register with the second permissions.

13. The method of claim 12, further comprising:
setting, by the computing device, the protection key register with the first permissions in response to executing the managed applet;
executing, by the computing device, a second domain switch routine to switch to a second managed applet in response to setting the protection key register with the first permissions, wherein the second protection domain includes the second domain switch routine and wherein the second managed applet is included in a fourth protection domain;
setting, by the computing device, the protection key register with third permissions in response to executing the second domain switch routine, wherein the third permissions disallow data access to any protection domain of the computing device other than the fourth protection domain; and
executing, by the computing device, the second managed applet in response to setting the protection key register with the third permissions.

14. The method of claim 13, wherein the first managed applet comprises a first thread of a process of the computing device and the second managed applet comprises a second thread of the process.

15. The method of claim 12, further comprising:
enforcing, by the processor of the computing device, the first permissions while executing the domain switch routine; and
enforcing, by the processor of the computing device, the second permissions while executing the managed applet.

16. The method of claim 12, further comprising:
setting, by the computing device, the protection key register with third permissions, wherein the third permissions disallow data access to the second protection domain; and
executing, by the computing device, the managed runtime environment in response to setting the protection key register with the third permissions.

17. The method of claim 16, further comprising:
assigning, by the computing device, a protection domain identifier to a fourth protection domain that includes managed runtime secure code or data;
execute, by the computing device, a second domain switch routine to switch to the managed runtime secure code in response to setting of the protection key register with the first permissions, wherein the second protection domain includes the second domain switch routine;

setting, by the computing device, the protection key register with fourth permissions in response to executing the second domain switch routine, wherein the fourth permissions disallow data access to the second protection domain; and executing, by the computing device, the managed runtime secure code or data in response to setting the protection key register with the fourth permissions;

wherein the third permissions further disallow data access to the fourth protection domain.

18. The method of claim 12, further comprising:

compiling, by the computing device, an applet code into the managed applet; and storing, by the computing device, the managed applet in the third protection domain in response to compiling the applet code;

wherein setting the protection key register comprises setting the protection key register in response to storing the managed applet in the third protection domain.

19. One or more non-transitory, computer-readable storage media comprising a plurality of instructions that in response to being executed cause a computing device to:

set a protection key register of a processor of the computing device with first permissions, wherein the first permissions disallow data access to any protection domain of the computing device;

execute a domain switch routine to switch to a managed applet in response to setting the protection key register with the first permissions, wherein the managed applet is managed by a managed runtime environment, and wherein the managed runtime environment is included in a first protection domain, the domain switch routine is included in a second protection domain, and the managed applet is included in a third protection domain;

set the protection key register with second permissions in response to executing the domain switch routine, wherein the second permissions disallow data access to any protection domain of the computing device other than the third protection domain; and execute the managed applet in response to setting the protection key register with the second permissions.

20. The one or more non-transitory, computer-readable storage media of claim 19, further comprising a plurality of instructions that in response to being executed cause the computing device to:

set the protection key register with the first permissions in response to executing the managed applet;

execute a second domain switch routine to switch to a second managed applet in response to setting the protection key register with the first permissions, wherein the second protection domain includes the second domain switch routine and wherein the second managed applet is included in a fourth protection domain;

set the protection key register with third permissions in response to executing the second domain switch routine, wherein the third permissions disallow data access to any protection domain of the computing device other than the fourth protection domain; and execute the second managed applet in response to setting the protection key register with the third permissions.

21. The one or more non-transitory, computer-readable storage media of claim 20, wherein the first managed applet comprises a first thread of a process of the computing device and the second managed applet comprises a second thread of the process.

22. The one or more non-transitory, computer-readable storage media of claim 19, further comprising a plurality of instructions that in response to being executed cause the computing device to:

enforce, by the processor of the computing device, the first permissions while executing the domain switch routine; and enforce, by the processor of the computing device, the second permissions while executing the managed applet.

23. The one or more non-transitory, computer-readable storage media of claim 19, further comprising a plurality of instructions that in response to being executed cause the computing device to:

set the protection key register with third permissions, wherein the third permissions disallow data access to the second protection domain; and execute the managed runtime environment in response to setting the protection key register with the third permissions.

24. The one or more non-transitory, computer-readable storage media of claim 23, further comprising a plurality of instructions that in response to being executed cause the computing device to:

assign a protection domain identifier to a fourth protection domain that includes managed runtime secure code or data;

execute a second domain switch routine to switch to the managed runtime secure code in response to setting of the protection key register with the first permissions, wherein the second protection domain includes the second domain switch routine;

set the protection key register with fourth permissions in response to executing the second domain switch routine, wherein the fourth permissions disallow data access to the second protection domain; and execute the managed runtime secure code or data in response to setting the protection key register with the fourth permissions;

wherein the third permissions further disallow data access to the fourth protection domain.

25. The one or more non-transitory, computer-readable storage media of claim 19, further comprising a plurality of instructions that in response to being executed cause the computing device to:

compile an applet code into the managed applet; and store the managed applet in the third protection domain in response to compiling the applet code;

wherein to set the protection key register comprises to set the protection key register in response to storing the managed applet in the third protection domain.

* * * * *